United States Patent [19]

Voss et al.

[11] Patent Number: 6,064,032
[45] Date of Patent: May 16, 2000

[54] APPARATUS IN A FILTER TIPPING MACHINE FOR MANIPULATING A WEB

[75] Inventors: Helmut Voss, Lokstedt; Manfred Dombek, Dassendorf, both of Germany

[73] Assignee: Hauni Maschinenbau AG, Hamburg, Germany

[21] Appl. No.: 09/087,851

[22] Filed: Jun. 1, 1998

[30] Foreign Application Priority Data

May 30, 1997 [DE] Germany .......................... 197 22 799

[51] Int. Cl.[7] ................................................. B23K 26/00
[52] U.S. Cl. ................ 219/121.67; 131/281; 219/121.7; 219/121.77
[58] Field of Search ........................... 219/121.7, 121.71, 219/121.76, 121.77, 121.67, 121.72; 131/281

[56] References Cited

U.S. PATENT DOCUMENTS

| | | |
|---|---|---|
| 3,974,007 | 8/1976 | Greve . |
| 4,090,826 | 5/1978 | Hinzmann ............................... 131/281 |
| 4,265,254 | 5/1981 | Koch et al. . |
| 4,281,670 | 8/1981 | Heitmann et al. ....................... 131/281 |
| 4,404,454 | 9/1983 | Taylor et al. .......................... 219/121.7 |
| 4,633,891 | 1/1987 | Mattei et al. . |
| 4,647,752 | 3/1987 | Mattei et al. . |
| 4,660,578 | 4/1987 | Mattei et al. . |
| 4,720,619 | 1/1988 | Mattei et al. . |
| 4,857,698 | 8/1989 | Perun ................................ 219/121.71 |
| 4,889,140 | 12/1989 | Lorenzen et al. . |
| 5,015,819 | 5/1991 | Neri et al. . |
| 5,060,668 | 10/1991 | Weinhold ............................... 131/281 |
| 5,092,350 | 3/1992 | Arthur et al. ........................... 131/281 |
| 5,135,008 | 8/1992 | Oesterling et al. . |
| 5,247,948 | 9/1993 | Andreoli et al. ........................ 131/281 |
| 5,259,401 | 11/1993 | Lange et al. ............................. 131/281 |
| 5,404,889 | 4/1995 | Belvederi et al. ....................... 131/281 |
| 5,529,401 | 6/1996 | Lange et al. ............................ 131/281 |

FOREIGN PATENT DOCUMENTS

| | | |
|---|---|---|
| 0549357A1 | 6/1993 | European Pat. Off. . |
| 2343996C2 | 3/1975 | Germany . |
| 4122273A1 | 1/1992 | Germany . |
| 59-153763 | 9/1984 | Japan . |
| 8-99185 | 4/1996 | Japan . |

OTHER PUBLICATIONS

"LongLife Diffractive Focusing Lenses", Industrial Laser Optics & Accessories, Jun. 1992.

Primary Examiner—Geoffrey S. Evans
Attorney, Agent, or Firm—Venable; George H. Spencer; Catherine M. Voorhees

[57] ABSTRACT

A running web of tipping paper (one side of which is coated with a film of adhesive) in a filter cigarette making machine is subdivided into discrete uniting bands and/or is perforated by resorting to a single source or to two discrete sources of coherent radiation. Each source is associated with a control unit which initiates the emission of short-lasting flashes of coherent radiation. Such radiation is caused to impinge upon a diffractive focusing lens which focuses coherent radiation upon one or more masks having openings for coherent radiation which is to sever the web along transversely extending linear zones and/or to provide the web with desired arrays of perforations. The perforations permit atmospheric air to enter the column of tobacco smoke in a filter cigarette wherein the tobacco-containing portion and the filter mouthpiece are united by a perforated adhesive-coated uniting band.

12 Claims, 4 Drawing Sheets

APPARATUS IN A FILTER TIPPING MACHINE FOR MANIPULATING A WEB

CROSS-REFERENCE TO RELATED APPLICATION

This application claims the priority of patent application Ser. No. 197 22 799.6 filed in Germany on May 30, 1997, the subject matter of which is incorporated herein by reference.

BACKGROUND OF THE INVENTION

The invention relates to improvements in methods of and in apparatus for manipulating webs or strips, especially running webs or strips of wrapping material in machines of the tobacco processing industry. More particularly, the invention relates to improvements in methods of and in apparatus for subdividing a running web or strip, e.g., a web of so-called tipping paper, into discrete web portions or sections (the so-called uniting bands) which are to be draped around neighboring ends of groups of coaxial rod-shaped articles to convert such groups into composite rod-shaped articles. Typical examples of composite rod-shaped articles are filter cigarettes wherein a plain cigarette of unit length and a filter plug or filter mouthpiece of unit length are joined end-to-end by an adhesive-coated uniting band of cigarette paper, artificial cork or any other suitable wrapping material.

Apparatus of the present invention can be utilized with advantage in or in conjunction with filter tipping machines which cooperate with cigarette making machines and with filter rod making machines to turn out filter cigarettes, filter cigars or analogous composite rod-shaped articles of the tobacco processing industry.

A modern filter tipping machine comprises a magazine for a supply of filter rod sections of several times unit length, a conveyor system which supplies plain cigarettes of unit length from a so-called maker, a receptacle for a reel of convoluted web of filter tipping material, a system for subdividing filter mouthpieces of multiple unit length into filter mouthpieces or filter plugs of double unit length and for converting such filter plugs into a single file of parallel articles, a system of drums which assemble discrete filter plugs of double unit length and pairs of plain cigarettes of unit length into groups of three coaxial rod-shaped articles (with the filter plug located between the two cigarettes), a paster which provides one side of the web with a film of a suitable adhesive, a mechanism for dividing the running adhesive-coated web of wrapping material into discrete uniting bands, a system which drapes successive uniting bands around the filter plugs and the adjacent ends of the respective pair of plain cigarettes to convert such groups into filter cigarettes of double unit length, and a cutter which subdivides successive filter cigarettes of double unit length into pairs of filter cigarettes of unit length.

It is further customary to provide the web of tipping paper with suitably distributed perforations which permit the inflow of cool atmospheric air into the column of tobacco smoke flowing into the smoker's mouth. Reference may be had, for example, to U.S. Pat. No. 4,281,670 (granted Aug. 4, 1981 to Heitmann et al. for "APPARATUS FOR INCREASING THE PERMEABILITY OF WRAPPING MATERIAL FOR ROD-SHAPED SMOKERS' PRODUCTS"). The disclosure of this patent is incorporated herein by reference. Heitmann et al. disclose perforating units which operate with laser beams. The means for subdividing a running web into discrete uniting bands employs a standard suction drum which attracts the leader of the web to its peripheral surface, and a rotary cutter with axially parallel knives which sever a succession of uniting bands from the leader of the perforated web.

German patent application No. 41 22 273 A1 of Andreoli et al. (published Jan. 16, 1992) discloses a web severing apparatus wherein the knife or knives is or are replaced with a laser beam issuing from a source of coherent radiation which further serves to effect a desired perforating operation. Thus, the beam of coherent radiation issuing from the source is split into a first continuous partial beam (which is deflected by a rotary polygonal mirror to follow the moving web in the course of each severing operation), and into a second continuous beam which is directed toward the outlet of the tipping machine and is converted into a sequence of pulses which serve to provide the finished filter cigarettes with perforations in the converted (convoluted) uniting band and/or in the adjacent portion of the tubular wrapper of the plain cigarette. A drawback of such proposal is that the provision of a source of laser beams and of the aforementioned beam splitting, directing, deflecting and pulse generating means contributes significantly to the bulk, cost, complexity and sensitivity (proneness to malfunction) of the tipping machine.

OBJECTS OF THE INVENTION

An object of the invention is to provide a novel and improved tipping machine wherein a source of laser beams and the beam manipulating means are much simpler, more reliable and less expensive than in heretofore known tipping machines for the making of composite rod-shaped smokers' products.

Another object of the invention is to provide a novel and improved method of severing a running web of tipping paper or the like with a beam of coherent radiation.

A further object of the invention is to provide a novel and improved method of utilizing a single laser beam for the subdivision of a running web into discrete sections (such as uniting bands) of desired length or width as well as for the provision of desired patterns of perforations in the running web and/or in the discrete sections of the web.

An additional object of the invention is to provide a novel and improved web severing and perforating apparatus which can be embodied in or associated with existing types of web processing machines, e.g., in tipping machines of the type wherein rod-shaped articles of the tobacco processing industry are assembled into filter tipped smokers' products.

Still another object of the invention is to provide the apparatus with novel and improved means for manipulating one or more beams of coherent radiation between a source and selected locations in a tipping machine for the mass-production of filter cigarettes or other types of rod-shaped filter tipped smokers' products.

A further object of the invention is to provide an apparatus which is designed in such a way that it can provide selected portions of a running web with arrays or sets of perforations which can be altered, if and when necessary, in a simple time saving operation and with a desired degree of accuracy.

SUMMARY OF THE INVENTION

One feature of the invention resides in the provision of a method of subdividing an elongated web of tipping paper or the like into a succession of discrete web portions (e.g., uniting bands). The improved method comprises the step of subjecting successive spaced-apart transversely extending linear zones of the web to the action of discrete short-lasting flashes of linear coherent radiation to thus sever discrete portions from the web.

Each discrete flash can be utilized to completely sever a discrete portion of the web, i.e., from one to the other marginal portion of such web.

The method can further comprise the step of advancing the web lengthwise in a predetermined direction along a predetermined path to thus locate successive linear zones of the web in a predetermined portion of the path. The subjecting step then comprises directing the discrete flashes against the linear zones of the web in the predetermined portion of the path.

The method can further comprise the step of coating the discrete portions of the web with a suitable adhesive prior to the subjecting step at the predetermined portion of the path.

Still further, the method can comprise the step of exposing selected regions of the web to the action of additional coherent radiation to thus perforate or puncture the selected regions of the web. Such exposing step can be carried out at least substantially simultaneously with the subjecting step.

Such method can further comprise the step of establishing discrete first and second sources of coherent radiation for the carrying out of the subjecting and exposing steps, respectively.

Alternatively, the method can further comprise the step of establishing a single source of coherent radiation for the carrying out of the subjecting and exposing steps. The just outlined method can further embody the feature that one of the subjecting and exposing steps follows the other of these (subjecting and exposing) steps.

At least one of the subjecting and exposing steps can include directing coherent radiation from a source through at least one filter having openings for the passage of coherent radiation from the source against selected portions of the web.

The subjecting step can include establishing at least one source of coherent radiation (e.g., a CO2 laser) and positioning a diffractive focusing lens between the source and the spaced-apart linear zones of the web.

Another feature of the invention resides in the provision of a novel apparatus for subdividing an elongated web of wrapping material for rod-shaped smokers' products. The improved apparatus comprises at least one source of coherent radiation (e.g., at least one CO2 laser), control means for initiating the emission of short-lasting flashes of radiation from the at least one source, and means for directing portions of at least some of the flashes against selected transversely extending linear portions of the web.

The control means can include means for initiating the emission of a single flash for each of a series of successive separations of portions of wrapping material from the web.

Still further, the apparatus can comprise means for advancing the web lengthwise in a predetermined direction along a predetermined path. In such apparatus, the means for directing can include means for focusing portions at least of flashes of coherent radiation against linear portions of the web in a predetermined portion of the predetermined path. Such apparatus can further comprise means for applying a film of a suitable adhesive to one side of the advancing web ahead (i.e., upstream) of the predetermined portion of the path (as seen in the predetermined direction).

The means for directing can comprise means for focusing coherent radiation upon selected portions of the web to provide the selected portions of the web with perforations. Such means for directing can comprise means for focusing coherent radiation upon selected portions of the web to provide the perforations simultaneously with the directing of portions at least of at least some flashes against the selected transversely extending linear portions of the web.

The source can comprise a single laser. Alternatively, the source can comprise a first laser for the subdivision of the web and a second laser for the making of perforations.

The control means can include means for initiating the emission of alternating first and second short-lasting flashes. The directing means of such apparatus can comprise means for directing the first flashes against the selected linear portions of the web, and means for focusing the radiation of the second flashes to provide the aforementioned perforations.

The means for directing can comprise at least one shield or mask or diaphragm (hereinafter called mask) which is disposed between the at least one source of coherent radiation and the web and is provided with openings for coherent radiation.

Alternatively, the means for directing can comprise a plurality of at least partially overlapping masks which are disposed between the at least one source of coherent radiation and the web. Such masks have openings for the passage of coherent radiation therethrough, and at least one of the masks is preferably movable relative to another of the overlapping masks to establish a selected extent of registry of openings of the masks with each other, i.e., to intercept larger or smaller quantities of radiation which propagates itself from the at least one source to the web.

The directing means can comprise at least one differential focusing lens between the at least one source of coherent radiation and the web.

The novel features which are considered as characteristic of the invention are set forth in particular in the appended claims. The improved apparatus itself, however, both as to its construction and the method of operating the same, together with numerous additional important and advantageous features and attributes thereof, will be best understood upon perusal of the following detailed description of certain presently preferred specific embodiments with reference to the accompanying drawings.

DESCRIPTION OF PREFERRED EMBODIMENTS

Figure 1:
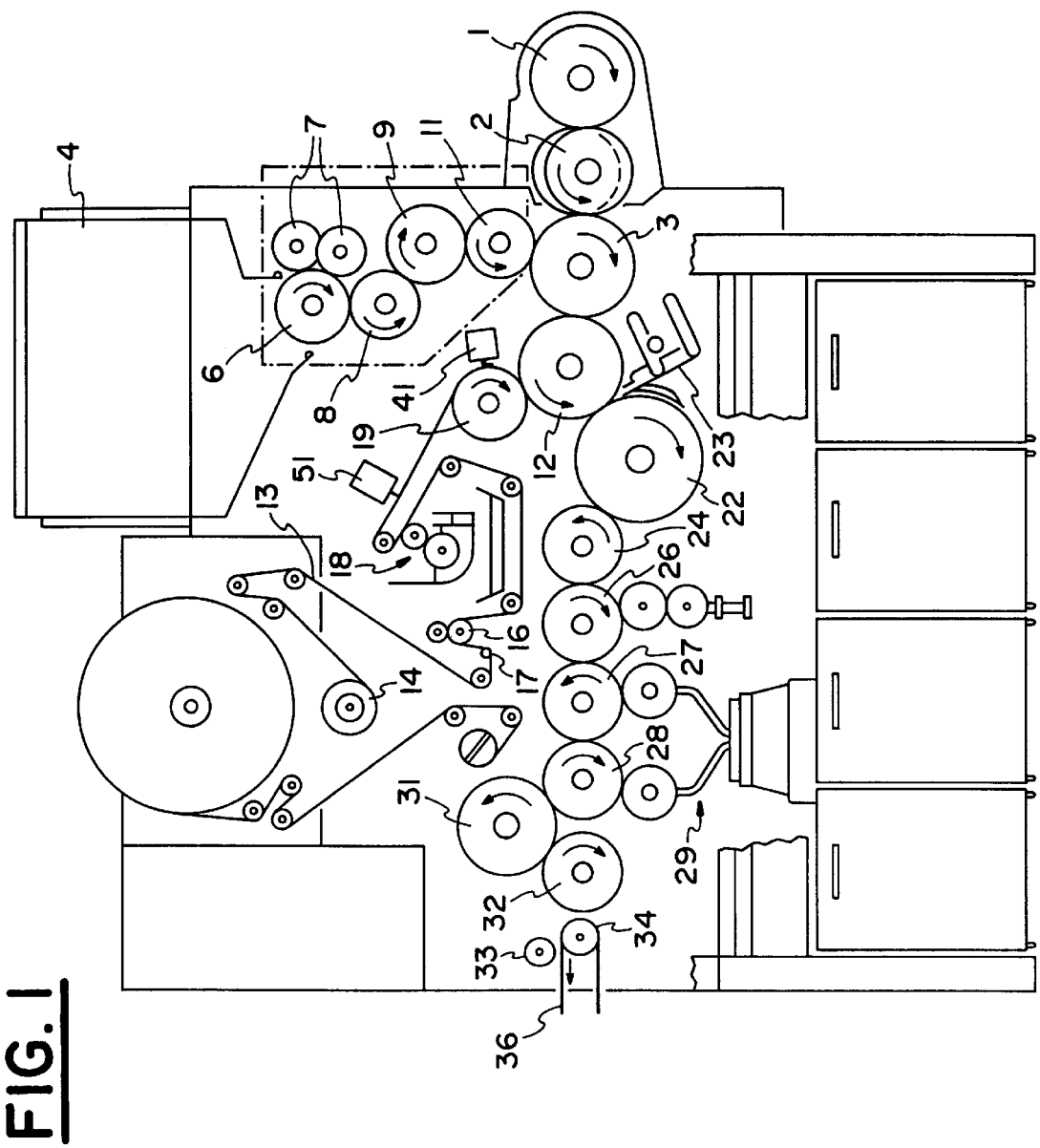
FIG. 1 is a diagrammatic front elevational view of a filter tipping machine known as MAX (distributed by the assignee of the present application) which includes apparatus for perforating and/or severing a running web of tipping paper.

The filter tipping machine (known as MAX and obtainable from Hauni Maschinenbau AG, the assignee of the present application) which is shown in FIG. 1 is similar to that shown in FIG. 1 of the '670 patent to Heitmann et al. and comprises a frame supporting a rotary drum-shaped conveyor 1 having axially parallel peripheral flutes each of which contains a single plain cigarette of unit length. The cigarettes in the neighboring flutes of the conveyor 1 are staggered with reference to each other as seen in the axial direction of the conveyor, so that they form two rows each adjacent a different axial end of the conveyor 1. Successive plain cigarettes of one row are transferred into successive flutes of one of two rotary drum-shaped aligning conveyors 2, and the cigarettes of the other row are transferred into successive flutes of the other aligning conveyor 2. The conveyors 2 advance the respective plain cigarettes at different speeds and/or through different distances to align each cigarette of one row with a cigarette of the other row not later than at the transfer station at which successive axially aligned pairs of plain cigarettes (with a clearance between their neighboring (inner) ends) are admitted into successive axially parallel peripheral flutes of a rotary drum-shaped assembly conveyor 3.

A magazine 4 at the top of the frame of the filter tipping machine contains a supply of filter rod sections of six times unit length. Such filter rod sections can be of the type produced in machines disclosed, for example, in U.S. Pat. No. 3,974,007 granted Aug. 10, 1976 to Heinz Greve for "METHOD AND APPARATUS FOR THE PRODUCTION OF FILTER ROD SECTIONS OR THE LIKE". The disclosure of this patent is incorporated herein by reference.

The outlet of the magazine 4 admits discrete filter rod sections of six times unit length into successive axially parallel peripheral flutes of a rotary drum-shaped severing conveyor 6. The latter cooperates with two axially and circumferentially staggered rotary circular knives 7 which subdivide each oncoming filter rod section of six times unit length into groups of three coaxial filter rod sections of double unit length each.

Successive groups are delivered into the flutes of a composite rotary drum-shaped staggering conveyor 8 which moves at least two filter rod sections of each group relative to each other and relative to the third filter rod section in a circumferential direction and transfers successive filter rod sections of double unit length into successive flutes of a rotary drum-shaped shuffling conveyor 9. The latter cooperates with suitable cams or the like (not shown) to form a single row of aligned filter rod sections which are advanced sideways into successive flutes of a rotary drum-shaped combined accelerating and inserting conveyor 11. The conveyor 11 inserts discrete filter rod sections of double unit length into the aforementioned clearances between successive pairs of plain cigarettes in the oncoming flutes of the assembly conveyor 3 so that each such flute of the conveyor 3 which has advanced beyond the transfer station between the conveyors 3 and 11 contains a group of three coaxial rod-shaped articles including two axially spaced-apart plain cigarettes of unit length and a filter rod section of double unit length between them. Successive groups are caused to advance between two cams or the like (not shown) which cause the plain cigarettes to move axially toward each other so that their inner ends abut the respective ends of the filter rod section between them. The thus condensed or shortened groups are transferred into successive flutes of a rotary drum-shaped transfer conveyor 12.

The frame of the filter tipping machine further supports an expiring reel 14 for a supply of an elongated web or strip 13 which is convoluted onto the core of the reel 14. The web 13 is advanced lengthwise by rollers lo which cause it to advance over the pronounced edge of a conventional curling tool 17, and a rotary drum-shaped suction conveyor 19 thereupon causes the web 13 to advance into and beyond a paster 18 serving to coat one side of the web with a film of a suitable adhesive.

The adhesive-coated leader of the web 13 is severed at requisite intervals at the periphery of the suction conveyor 19 to yield a succession of adhesive coated discrete portions or uniting bands 13a (see FIG. 2) which are attached to successive groups of rod-shaped articles in the flutes of the transfer conveyor 12. Each uniting band 13a extends along and slightly beyond both axial ends of the respective filter rod section of double unit length.

Successive groups of rod-shaped articles (each such group carries a uniting band 13a) are transferred onto a drum-shaped rolling or wrapping conveyor 22 which cooperates with a normally stationary rolling member 23 to convolute the uniting bands around the respective filter rod sections and around the adjacent inner ends of the respective pairs of plain cigarettes of unit length. The thus obtained filter cigarettes of double unit length are delivered into the flutes of a rotary drum-shaped adhesive drying or setting conveyor 24 which, in turn, delivers successive filter cigarettes of double unit length into the peripheral flutes of a rotary drum-shaped subdividing conveyor 26 cooperating with a circular knife to sever each filter cigarette of double unit length midway across the tubular wrapper (converted or rolled uniting band 13a) so that a conveyor 27 of a turnaround device 29 receives pairs of coaxial filter cigarettes of unit length. The device 29 inverts one filter cigarette of each pair end-for-end so that the single-length filter mouthpieces of all filter cigarettes face in the same direction not later than on a further conveyor 28 of the turn-round device 29 and the inverted and non-inverted filter cigarettes form a single row of parallel cigarettes which are caused to move sideways.

The conveyor 28 delivers successive filter cigarettes of the single row into successive flutes of at least one rotary drum-shaped testing conveyor 31 which is followed by a combined testing and ejecting conveyor 32. The conveyor 31 can advance successive filter cigarettes of unit Length past several testing devices (not specifically shown) which can monitor the quality of the seams, the presence or absence of filter mouthpieces, the presence of smudges and/or other characteristics. The conveyor 32 can cooperate with a testing device which ascertains the density of the tobacco-containing ends of successive filter cigarettes of unit length and the conveyor 32 can (e.g., mechanically and/or pneumatically) eject those filter cigarettes which exhibit one or more defects of a nature which warrants the segregation of such products from satisfactory rod-shaped products. A take-off conveyor (e.g., an endless belt or chain conveyor having an endless flexible element 36 trained over several pulleys, sheaves or sprocket wheels 34 of which only one is actually shown in FIG. 1) cooperates with a decelerating device 33 and serves to advance satisfactory filter cigarettes of unit length to a next processing station, e.g., into a reservoir or into a packing machine or to another destination. The just described method of producing filter cigarettes of unit length is similar to that disclosed in commonly owned U.S. Pat. No. 5,135,008 granted Aug. 4, 1992 to Erwin Oesterling et al. for "METHOD OF AND APPARATUS FOR MAKING FILTER CIGARETTES". The disclosure of this patent is also incorporated herein by reference.

Figure 2:
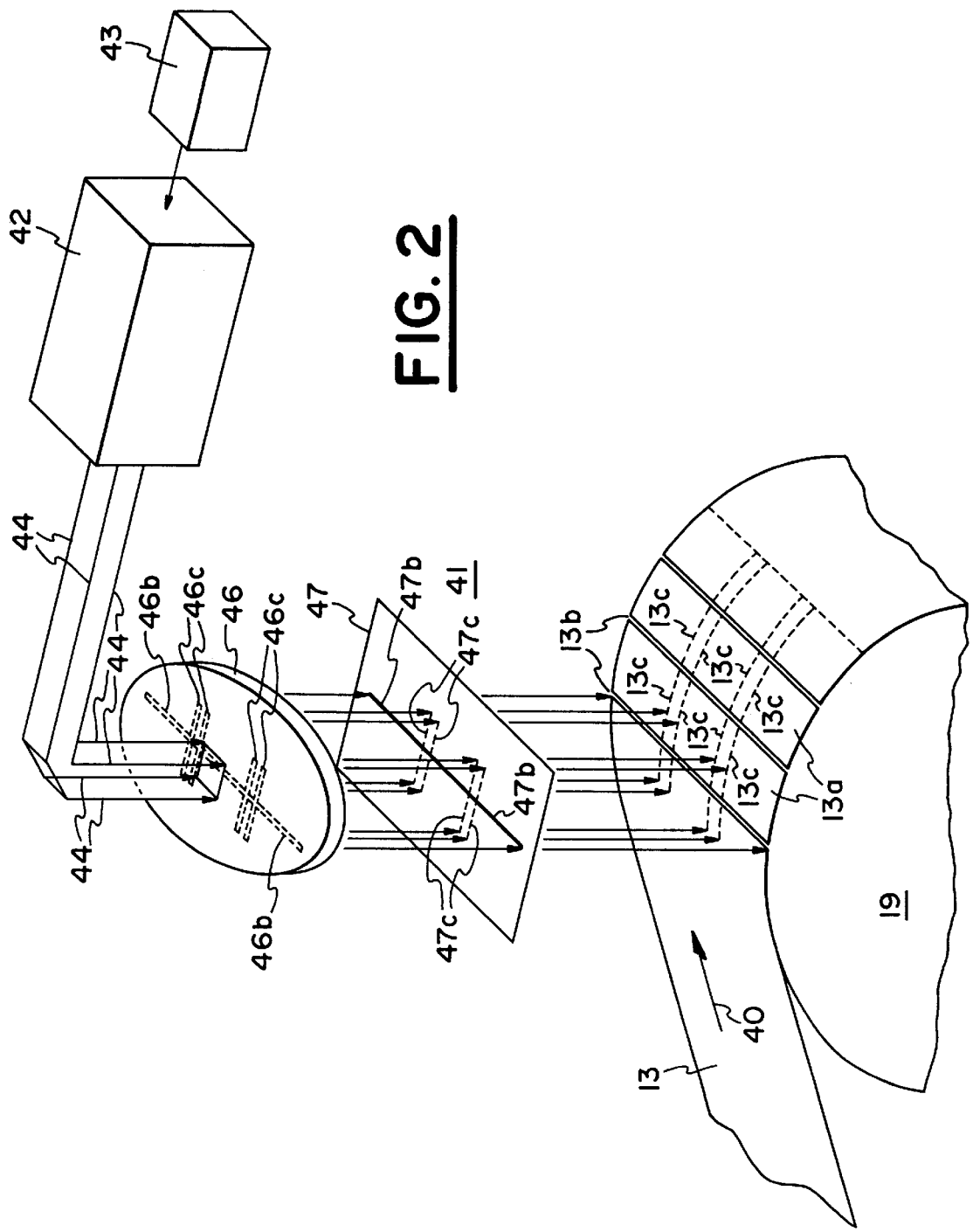
FIG. 2 is a perspective view of an apparatus which can simultaneously sever and perforate the running web in the tipping machine of FIG. 1.

The reference character 41 denotes in FIG. 1 one presently preferred combined web severing or subdividing and web perforating apparatus the details of which are shown in FIG. 2. The lower part of FIG. 2 shows a portion of the aforementioned suction conveyor 19 which advances the adhesive-coated web 13 lengthwise (as indicated by the arrow 40) and past a combined severing and perforating station at the periphery of the conveyor 19.

The leader of the web 13 is severed transversely of the direction which is indicated by the arrow 40. The transversely extending linear zones for the severing of the web 13 are shown at 13b, and the individual or discrete portions or uniting bands are shown at 13a. The characters 13c denote selected web portions which are provided with arrays (here shown as rows) of perforations extending in the longitudinal direction of the running web 13. The rows 13c extend transversely across the entire uniting bands 13a; this ensures that each convoluted uniting band 13a is provided with four annuli of perforations (at 13c). In other words, the convoluted uniting band of each filter cigarette of unit length on the conveyor 27 of FIG. 1 (i.e., each half of a uniting band 13a) has two annuli of perforations for the admission of atmospheric air. It is to be recalled that each convoluted uniting band 13a is severed while advancing with the conveyor 26 which cooperates with the non-referenced rotary circular knife to subdivide successive filter cigarettes of double unit length into pairs of filter cigarettes of unit length. Each such filter cigarette of unit length comprises one-half of a convoluted (tubular) uniting band 13a.

The apparatus 41 comprises a radiation directing unit in combination with a single source 42 of coherent radiation in the form of a so-called TEA laser, e.g., a laser of the type known as IMPACT 3000 distributed by the Firm LUMONICS GmbH, Junkersstrasse 5, D-82178 Puchheim, Federal Republic Germany. A TEA laser is a CO2 laser which can furnish high-energy flashes of coherent radiation 44 of exceptionally short duration in the range of one microsecond. The reference character 43 denotes a control unit for the laser 42; this control unit furnishes signals at a frequency corresponding to the speed of the filter tipping machine of FIG. 1. Such signals determine the instants when the radiation directing unit of the apparatus 41 directs against the web 13 flashes of coherent radiation to form successive cuts at 13b and to form the perforations at 13c.

The coherent radiation 44 which is emitted by the single source 42 is directed upon a diffractive focusing lens 46 of the radiation directing unit, e.g., a lens of the type distributed by Coherent, Inc., 2301 Lindbergh Street, Auburn, Calif. 95602. The optical characteristics of a diffractive focusing lens can be designed to convert beams of coherent radiation into linear beams extending in any desired direction. The lens 46 of FIG. 2 is designed in such a way that the flashes of coherent radiation 44 are converted into a linear beam 46b serving to cut the web 13 along a linear zone 13b and four linear beams 46c which extend at right angles to the beam 46b and serve to form the four rows of perforations at 13c. The directing unit of the apparatus 41 further comprises a mask, diaphragm or filter 47 (hereinafter called mask) which is located between the lens 46 and the path for the running web at the periphery of the conveyor 19. This mask 47 is provided with a linear opening or slot 47b for the beam 46b, and with four rows 47c of openings in line with the linear beams 46c. The slot 47b and the openings of the rows 47c serve to impart to the beams actually reaching the web 13 a sharply defined configuration or outline. The apparatus 41 of FIG. 2 can be furnished with a set of spare masks having openings 47c of different sizes and/or in different distributions. This renders it possible to select the sizes of the perforations (at 13c) in the running web 13.

An important advantage of the apparatus 41 is that one can resort to short-lasting high-energy flashes of coherent radiation 44 in order to provide the web 13 with straight transverse cuts at 13b while the web is compelled to carry out a linear movement. At the same time, the beam which is converted (in part) into short-lasting high-energy flashes can be utilized to provide selected portions 13c of the running web 13 with a desired number of perforations in a desired (simple or complex) distribution or array.

It goes without saying that, if it should become necessary or desirable, the entire beam 44 of coherent radiation can be converted only into a linear beam (this will be described in detail in connection with FIG. 3) or only into one or more linear or other beams which is or are utilized to provide the running web 13 with one or more rows and/or other arrays of perforations (this will be described in detail with reference to FIG. 4).

Still further, it is possible to design the control unit 43 in such a way that the laser 42 emits a sequence of successive beams a first of which is caused to sever the web 13 at 13b, the next of which is used to form at least one row of perforations at 13c, the third of which is used to form a cut at 13b, and so forth.

Still further, it is possible to employ several lasers 42, for example, two discrete lasers one of which serves exclusively to furnish a beam 44 which is converted into a succession of linear beams at 46b and the other of which is used to form one or more rows of perforations at 13c. A similar apparatus will be described with reference to FIGS. 3 and 4.

It is further clear that the diffractive focusing lens 46 of FIG. 2 can be replaced with a much simpler lens if the beam 44 is utilized exclusively to form the transverse cuts at 13b, i.e., to subdivide the leader of the web 13 into a succession of discrete uniting bands 13a. The same holds true if the lens 46 is to be replaced with a lens which serves exclusively to focus coherent radiation to be used for the making of perforations.

In FIG. 2, the means for advancing the leader of the web 13 (i.e., that portion of the web which is to yield a series of successive uniting bands 13a and one side of which is already coated with a film of adhesive) includes the cylindrical peripheral surface of the suction conveyor 19. Such guidance of the web while its leader is exposed to the action of linear coherent radiation which is to form the rows 13c of perforations can entail some distortion of certain perforations. In other words, all of the perforations at 13c might not have identical sizes and/or shapes (provided, of course, that the apparatus 41 is intended to provide the web with perforations of identical size and/or shape). This can be prevented by designing the lens 46 with a view to avoid such departure(s) of the size and/or shape of some perforations from a prescribed or optimum size and/or shape, i.e., to avoid any (or any appreciable) distortion of the perforations.

The drum-shaped (cylindrical) conveyor 19 can be replaced with a plane body which ensures that the leader of the web 13 lies flat while it is exposed to the action of laser radiation 46b or 46c. For example, the cylindrical conveyor 19 can be replaced with an endless band of a suitable metallic material which is trained over suitable pulleys, sheaves or sprocket wheels and has a straight upper reach or run overlying a suction chamber which attracts the running web during advancement beneath the radiation directing unit including the lens 46 and the mask 47 of the apparatus 41 shown in FIG. 2. Such web conveying and guiding means is or is likely to be preferred in many instances, and such conveying and guiding means can be employed if the leader of the web is to be cut into portions analogous to the uniting bands 13a of FIG. 2 and/or if the web is to be provided with one or more rows 13c of perforations.

Any desired change in the dimensions of perforations in the rows 13c and/or in other distribution can be achieved without the need to replace the mask 47 with a different mask and/or without an interruption of a severing and/or perforating operation (e.g., to replace the illustrated mask 47 with a different mask) by employing at least two at least partially overlapping masks each having a discrete array of suitably configurated and/or dimensioned openings, e.g., square, rectangular or other polygonal openings. The extent of register of the openings in one of the masks with the openings in the other mask or masks can be altered by the simple expedient of even slightly shifting at least one of the masks relative to the other mask or masks to thus change the sizes and/or the shapes of perforations formed by coherent radiation penetrating through such sets of at least partially registering openings. In other words, it is possible to influence the size and/or the shape of perforations by the expedient of varying the dimensions of the composite openings or windows formed by the registering portions of openings in the overlapping masks.

A presently known mode of simultaneously forming four rows of perforations in a running web of wrapping material for cigarettes and/or filter rods by resorting to coherent radiation is disclosed in commonly owned U.S. Pat. No. 4,889,140 granted Dec. 26, 1989 to Heinz C. Lorenzen et al. for "APPARATUS FOR MAKING PERFORATIONS IN ARTICLES OF THE TOBACCO PROCESSING INDUSTRY." The disclosure of this patent (which does not mention the utilization of short-lasting flashes of coherent radiation for the making of transverse cuts across a running web and/or for the making of perforations) is incorporated herein by reference.

An apparatus for making perforations in the wrappers of finished rod-shaped articles of the tobacco processing industry by means of laser beams is disclosed in commonly owned U.S. Pat. No. 4,265,254 granted May 5, 1981 to Franz-Peter Koch et al. for "APPARATUS FOR PERFORATING CIGARETTE PAPER OR THE LIKE". The disclosure of this patent, too, is incorporated herein by reference.

Figure 3:
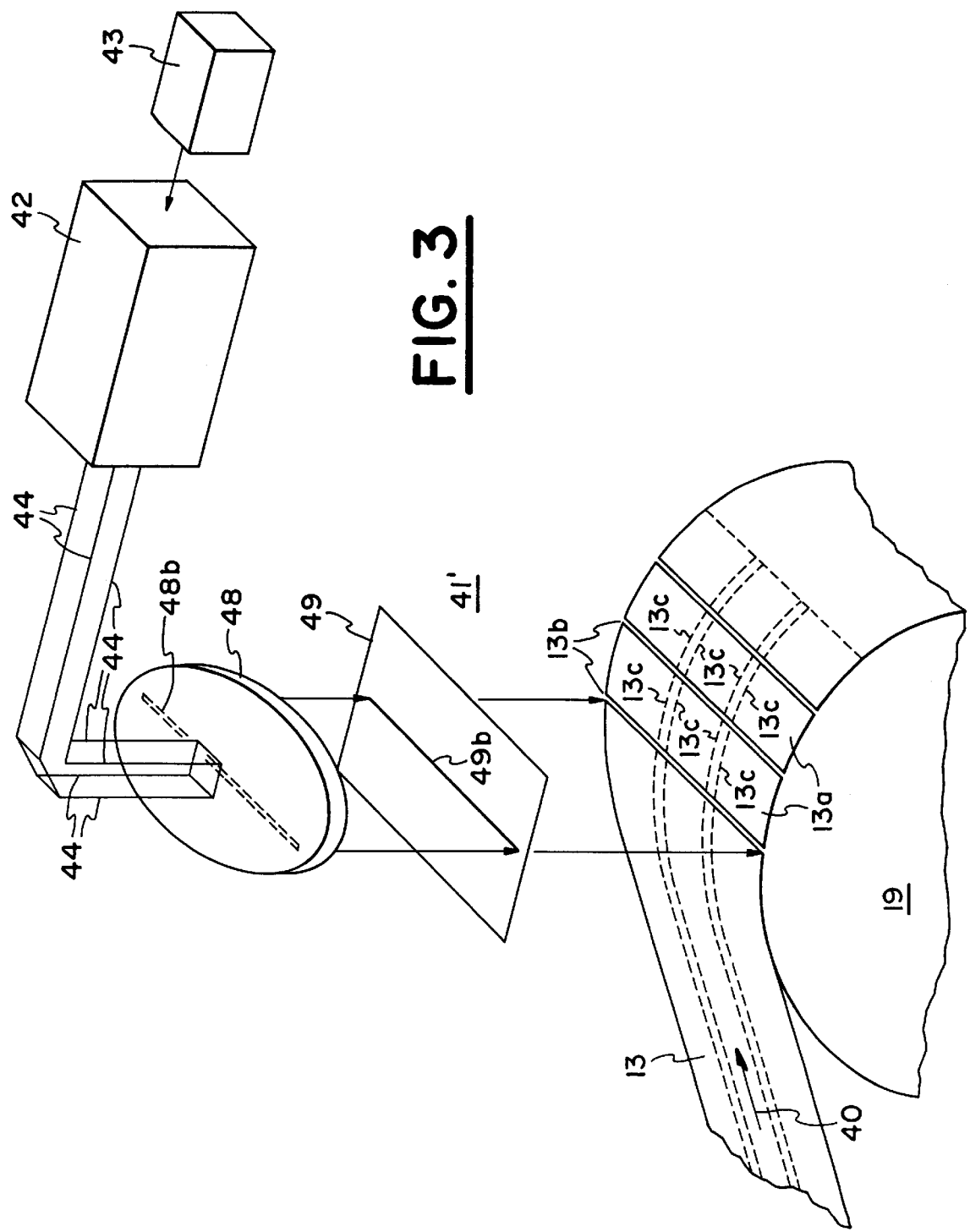
FIG. 3 is a similar perspective view of an apparatus which is designed to subdivide a perforated web of tipping paper into discrete uniting bands.

FIG. 3 shows a portion 411 of a composite apparatus which is identical with the apparatus 41 of FIG. 2 except that it employs a modified radiation directing unit having a different diffractive focusing lens 48 and a modified mask 49. This portion 41' of the composite apparatus serves to sever the leader of the web 13 at successive linear zones 13b to form a series of discrete web portions or uniting bands 13a. The lens 48 has a single row of openings 48b for portions of coherent radiation issuing from a source 42, e.g., of the type already described with reference to FIG. 2 and designed to furnish short-lasting flashes of coherent radiation 44 in response to signals from the control unit 43. The mask 49 has a single elongated opening or slot 49b for radiation which is focused by the lens 48 and is to sever the running web 13 along the linear zones 13b.

FIG. 3 shows that the web 13 which is being advanced by the suction conveyor 19 is already provided with four rows 13c of perforations. To this end, the apparatus which includes the portion 41' of FIG. 3 further comprises a second portion 51 (shown in FIGS. 1 and 4) serving to provide the running web 13 with the rows 13c of perforations upstream of the conveyor 19 (see particularly FIG. 1). The apparatus portion 51 comprises a radiation source 42, a control unit 43 and a different radiation directing unit having a diffractive focusing lens 52 and a mask 54 between the lens 52 and the perforating station 53 for the running web 13.

The lens 52 has rows 52b of perforations extending in the direction of the arrow 40, and this lens serves to focus portions of flashes of coherent radiation 44 upon the respective openings or holes in the mask 54. The pattern of holes 56 in the mask 54 determines the distribution of perforations in the rows 13c of perforations in the web 13.

Figure 4:
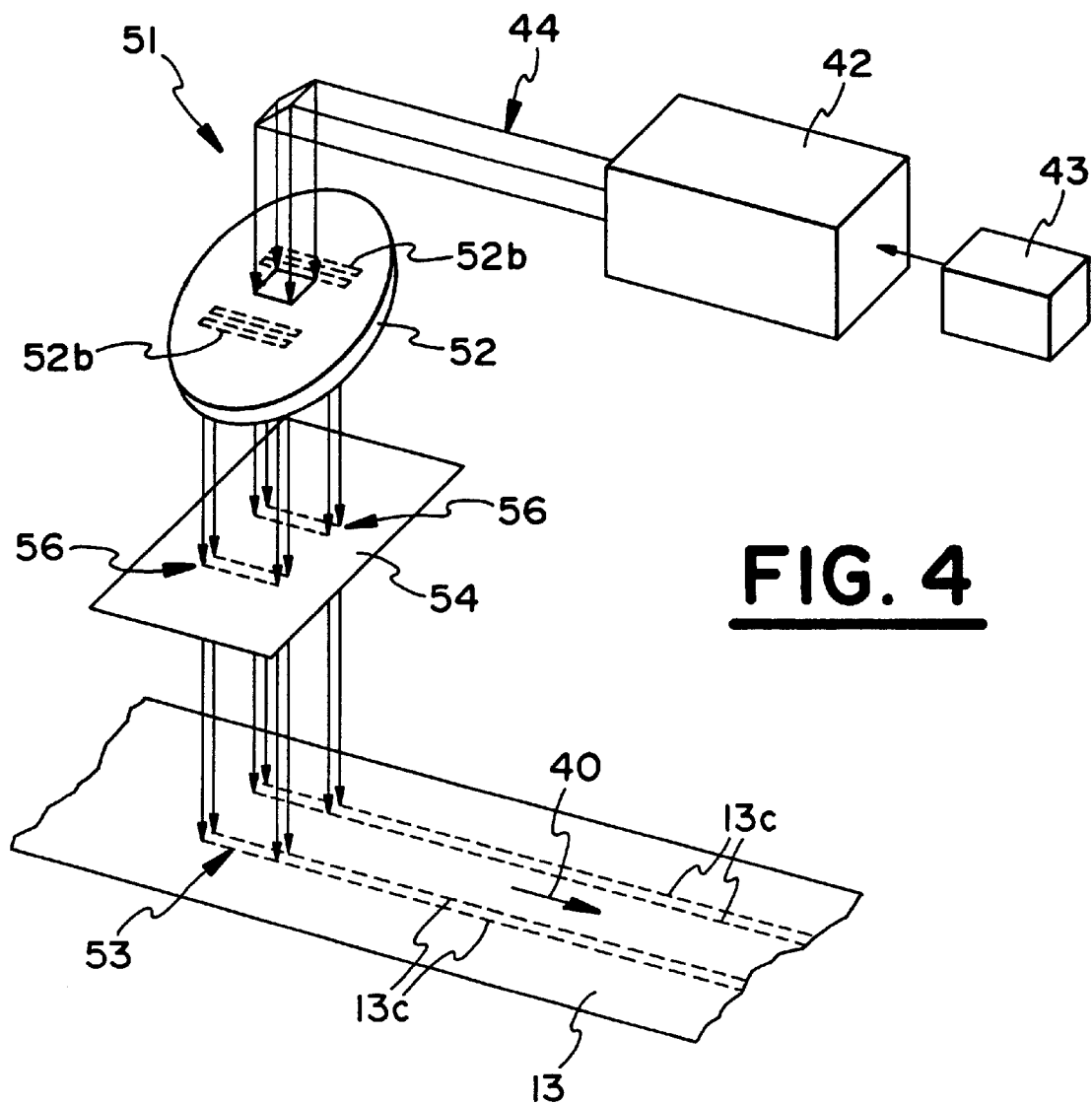
FIG. 4 is a perspective view of an apparatus which can be utilized to perforate a running web upstream of the apparatus of FIG. 3.

An advantage of the composite apparatus including the portions 41' and 51 of FIGS. 3 and 4 is that lower-energy sources 42 of coherent radiation suffice to form the transverse cuts at 13b in FIG. 3 and the perforations in the rows 13c of FIG. 4. Furthermore, the diffractive focusing lenses 48 and 52 are much simpler and less expensive than the lens 46 in the apparatus 41 of FIG. 2.

Furthermore, the portions 41' and 51 of the composite apparatus including the structures shown in FIGS. 3 and 4 can be utilized independently of each other, i.e., to merely provide the web 13 with arrays of perforations but to sever the web by mechanical or any other means not employing coherent radiation or by severing means employing coherent radiation but not in a manner as described with reference to FIGS. 2 and 3.

Analogously, the apparatus portion 41' of FIG. 3 can be utilized with any other perforating means, i.e., not with a perforating arrangement of the type shown at 51 in FIG. 4.

An important advantage of the improved method and apparatus is that the making of cuts along the linear zones 13b does not necessitate a guidance of a beam of coherent radiation along each of the linear zones 13b. This renders it possible to dispense with complex, sensitive, expensive and unreliable components or accessories which are required in conventional web severing apparatus employing beams of coherent radiation. Such accessories include rapidly rotating polygonal mirrors and driving means and controls therefor.

Another advantage of the improved method and apparatus, particularly of the apparatus of FIG. 2 and of the corresponding method, is that the transverse severing of the running web and the making of perforations in such web take place simultaneously by resorting to successive short-lasting flashes of coherent radiation. As already mentioned hereinbefore, it is possible to employ first, third, etc. flashes to sever the leader of the web, and to employ the second, fourth, etc. flashes to perforate the web (or vice versa).

An additional advantage of the apparatus 41 of FIG. 2 and of that portion (51) of the composite apparatus 41', 51 which is shown in FIG. 4 is that all of the perforations to be provided in successive increments of the running web can be formed simultaneously with stepwise subdivision of the running web into a succession of uniting bands 13a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art of manipulating webs of wrapping material for rod-shaped smokers' products and, therefore, such adaptations should and are intended to be comprehended within the meaning and range of equivalence of the appeded claims.

What is claimed is:

1. Apparatus for subdividing an elongated web of wrapping material for rod-shaped smokers' products, comprising at least one source of coherent radiation; control means for initiating the emission of short-lasting flashes of radiation from the at least one source; and means for directing portions at least of at least some of said flashes against selected transversely extending linear portions of the web, including means for focussing portions at least of some of said flashes of coherent radiation against linear portions of the web in a predetermined portion of said path.

2. The apparatus of claim 1, wherein said control means includes means for initiating the emission of a single flash for each of a series of successive separations of portions of wrapping material from the web.

3. The apparatus of claim 1, further comprising means for advancing the web lengthwise in a predetermined direction along a predetermined path.

4. The apparatus of claim 3, further comprising means for applying a film of an adhesive to one side of the advancing web ahead of said predetermined portion of said path as seen in said predetermined direction.

5. The apparatus of claim 1, wherein said means for directing further comprises means for focusing coherent radiation upon selected portions of the web to provide the selected portions with perforations.

6. The apparatus of claim 5, wherein said means for directing comprises means for focusing coherent radiation upon selected portions of the web to provide said perforations simultaneously with the directing of portions at least of at least some flashes against said selected transversely extending linear portions of the web.

7. The apparatus of claim 5, wherein said source comprises a single laser.

8. The apparatus of claim 5, wherein said source comprises a first laser for the subdivision of the web and a second laser for the making of said perforations.

9. The apparatus of claim 5, wherein said control means includes means for initiating the emission of alternating first and second short-lasting flashes, said directing means including means for directing said first flashes against said selected linear portions of the web and means for focusing the radiation of said second flashes to provide the web with said perforations.

10. The apparatus of claim 1, wherein said means for directing comprises at least one mask disposed between said source and the web and provided with openings for coherent radiation.

11. The apparatus of claim 1, wherein said means for directing comprises a plurality of at least partially overlapping masks disposed between said source and the web, said masks having openings for the passage of coherent radiation therethrough and at least one of said masks being movable relative to another said masks to establish a selected extent of registry of openings of said masks with each other.

12. The apparatus of claim 1, wherein said directing means comprises at least one differential focusing lens between said source and the web.

* * * * *